US012194812B2

United States Patent
Sadakata

(10) Patent No.: US 12,194,812 B2
(45) Date of Patent: Jan. 14, 2025

(54) COOLING APPARATUS FOR VEHICLE

(71) Applicant: Daimler AG, Stuttgart (DE)

(72) Inventor: Ichiro Sadakata, Kawasaki (JP)

(73) Assignee: Daimler Truck AG, Leinfelden-Echterdingen (DE)

(*) Notice: Subject to any disclaimer, the term of this patent is extended or adjusted under 35 U.S.C. 154(b) by 461 days.

(21) Appl. No.: 17/627,413

(22) PCT Filed: Jun. 17, 2020

(86) PCT No.: PCT/JP2020/023705
§ 371 (c)(1),
(2) Date: Jan. 14, 2022

(87) PCT Pub. No.: WO2021/010081
PCT Pub. Date: Jan. 21, 2021

(65) Prior Publication Data
US 2022/0258568 A1    Aug. 18, 2022

(30) Foreign Application Priority Data
Jul. 17, 2019   (JP) .................................. 2019-131781

(51) Int. Cl.
*B60H 1/00*    (2006.01)
*B60K 1/00*    (2006.01)
(Continued)

(52) U.S. Cl.
CPC ..... *B60H 1/00885* (2013.01); *B60H 1/00571* (2013.01); *B60K 11/02* (2013.01);
(Continued)

(58) Field of Classification Search
CPC ............ B60H 1/00885; B60H 1/00571; B60K 11/02; B60K 2001/003; B60K 2001/005;
(Continued)

(56) References Cited

U.S. PATENT DOCUMENTS 8,479,855 B2 *   7/2013   Kim .................... B60K 11/02
                                                              62/239
8,822,093 B2 *   9/2014   Kim .................... B60K 11/04
                                                              429/436
(Continued)

FOREIGN PATENT DOCUMENTS

CN           108340759 A        7/2018
DE     10 2012 108 043 A1       5/2014
(Continued)

OTHER PUBLICATIONS

Chinese Office Action issued in Chinese Application No. 202080051069.0 dated Jul. 28, 2023, with English machine translation (14 pages).
(Continued)

*Primary Examiner* — Ljiljana V. Ciric
(74) *Attorney, Agent, or Firm* — Crowell & Moring LLP

(57) ABSTRACT

A cooling apparatus for a vehicle for cooling a high-voltage device group mounted on the vehicle includes a radiator mechanism including a first radiator, a fan disposed adjacent to the first radiator, and a second radiator disposed between the first radiator and the fan. A first refrigerant circulation circuit performs heat exchange with a first group device in the high-voltage device group by circulation of a first refrigerant which radiates heat by the first radiator. A second refrigerant circulation circuit performs heat exchange with a second group device in the high-voltage device group by circulation of a second refrigerant which radiates heat by the second radiator. A chiller circuit includes a chiller where the chiller circuit includes a communication circuit which causes a downstream side of the chiller and an upstream side of the first radiator to communicate with each other through a flow-passage switching valve.

3 Claims, 2 Drawing Sheets

(51) Int. Cl.
 B60K 11/02 (2006.01)
 B60L 1/02 (2006.01)
 B60L 58/26 (2019.01)
(52) U.S. Cl.
 CPC ............... B60L 1/02 (2013.01); B60L 58/26 (2019.02); *B60K 2001/003* (2013.01); *B60K 2001/005* (2013.01); *B60K 2001/006* (2013.01); *B60L 2240/425* (2013.01); *B60L 2240/525* (2013.01); *B60L 2240/545* (2013.01); *B60Y 2200/14* (2013.01)
(58) Field of Classification Search
 CPC .... B60K 2001/006; B60K 1/04; B60K 11/04; B60L 1/02; B60L 58/26; B60L 2240/425; B60L 2240/525; B60L 2240/545; B60L 3/00; B60Y 2200/14
 See application file for complete search history.

(56) References Cited

U.S. PATENT DOCUMENTS

| | | | | |
|---|---|---|---|---|
| 8,991,204 | B2* | 3/2015 | Otake | F24D 17/02 62/175 |
| 11,456,497 | B2* | 9/2022 | Mackenzie | H01M 10/625 |
| 2012/0085510 | A1 | 4/2012 | Kim et al. | |
| 2017/0166043 | A1* | 6/2017 | Yun | B60K 11/06 |
| 2019/0255935 | A1* | 8/2019 | Tsuji | B60K 11/06 |
| 2022/0258568 | A1* | 8/2022 | Sadakata | B60K 11/02 |

FOREIGN PATENT DOCUMENTS

| | | | | |
|---|---|---|---|---|
| EP | 3598565 | B1 * | 10/2021 | ......... B60H 1/00278 |
| JP | 2000-315513 | A | 11/2000 | |
| JP | 2019-47548 | A | 3/2019 | |
| KR | 10-2018-0003985 | A | 1/2018 | |
| WO | WO 2017/179324 | A1 | 10/2017 | |
| WO | WO 2018/208208 | A1 | 11/2018 | |

OTHER PUBLICATIONS

PCT/JP2020/023705, International Search Report dated Aug. 18, 2020 (Two (2) pages).

English-language Extended European Search Report issued in European application No. 20839817.2-1012 dated Jun. 13, 2023 (Seven (7) pages).

Japanese Office Action issued in Japanese application No. 2019-131781 dated Jul. 26, 2023, with English translation (Six (6) pages).

* cited by examiner

COOLING APPARATUS FOR VEHICLE

TECHNICAL FIELD

The present invention relates to a cooling apparatus for vehicle.

BACKGROUND ART

Recently, an electric truck not including an internal combustion engine but driven only by an electric motor has been developed also in a field of commercial vehicles such as trucks from a viewpoint of reduction in environmental loads. In order to alleviate heat generation accompanying operations, a high-voltage device mounted on the electric vehicle as above has a temperature thereof adjusted by a cooling apparatus for vehicle constituted by a circuit through which a heat medium cooled by a radiator is circulated. Here, the high-voltage apparatuses such as a battery, an inverter, a motor and the like have optimal operating temperature ranges, respectively, and thus, a plurality of radiators and a plurality of refrigerant circulation circuits are provided in the cooling apparatus for vehicle in some cases (see PTL 1, for example).

CITATION LIST

Patent Literature

[PTL 1] Japanese Patent Application Publication No. 2019-47548

SUMMARY OF INVENTION

Technical Problem

However, in such a cooling apparatus for vehicle as above, the high-voltage devices need a capacity larger than a cooling capacity in an ordinary system design in some cases. They include a case in which a switching element or the like of the inverter has a temperature higher than usual due to electric nonconformity, a case in which nonconformity occurs in an oil circulation path in a motor housing, and an oil amount in the motor becomes excessive, which leads to an overload in a rotor and an overheat state and the like.

Particularly in the case of a system in which a plurality of radiators and a single fan are aligned and disposed in a vehicle longitudinal direction, the other second radiator disposed between the one first radiator and the fan performs heat exchange with outside air after the heat exchange by the first radiator. Thus, when the second radiator needs a capacity larger than a cooling capacity in the ordinary system design, it is technically difficult to easily increase the cooling capacity.

By considering such cases, the cooling capacity in the ordinary system design could be increased by making the system redundant by providing a fan for each radiator, for example, but there is a concern that an increase in a system size and costs could be incurred as a result.

The present invention was made in view of such circumstances and an object thereof is to provide a cooling apparatus for vehicle which can increase the cooling capacity easily without making the system redundant even if the high-voltage device cooled by the radiator needs the cooling capacity larger than the ordinary at emergency.

Solution to Problem

A cooling apparatus for vehicle according to the present invention is a cooling apparatus for vehicle which cools a high-voltage device group mounted on a vehicle and includes a radiator mechanism including a first radiator, a fan provided adjacent to the first radiator, and a second radiator disposed between the first radiator and the fan, a first refrigerant circulation circuit which performs heat exchange with a first group device in the high-voltage device group by circulation of a first refrigerant which radiates heat by the first radiator, a second refrigerant circulation circuit which performs heat exchange with a second group device of the high-voltage device group by circulation of a second refrigerant which radiates heat by the second radiator, a chiller circuit including a chiller which cools the refrigerant and a communication circuit formed which causes a downstream side of the chiller and an upstream side of the first radiator to communicate with each other through a flow-passage switching valve, and a control portion which determines whether a cooling capacity of the second refrigerant circulation circuit is sufficient or not on the basis of temperature related information corresponding to a temperature of the second group device, in which the control portion controls the flow-passage switching valve so that the refrigerant cooled by the chiller flows to the first radiator when the cooling capacity is insufficient.

In the cooling apparatus for vehicle, in the radiator mechanism in which the first radiator, the second radiator, and the fan are disposed in order, when the second group device cooled by the second radiator through the second refrigerant needs the cooling capacity larger than the ordinary, the refrigerant cooled by the chiller is supplied to the first radiator through the communication circuit. At this time, since the first radiator can cool the outside air taken in by the fan using the refrigerant cooled by the chiller, it can supply the cooled outside air to the second radiator disposed on the downstream side. As a result, the second radiator cools the second refrigerant by the outside air, it can increase the cooling capacity for the second group device.

Moreover, at this time, the cooling efficiency of the second radiator can be improved without employing means for providing a fan for each radiator or means for increasing the size of the fan. Therefore, according to the cooling apparatus for vehicle according to the present invention, even if the high-voltage device cooled by the radiator needs a cooling capacity larger than the ordinary at emergency, the cooling capacity can be increased easily without making the system redundant.

DESCRIPTION OF EMBODIMENTS

Hereinafter, an embodiment of the present invention will be described in detail with reference to the attached drawings. It is to be noted that the present invention is not limited to the contents described below but can be embodied with arbitrary changes within a range not changing the gist thereof. Moreover, the drawings used for the description of the embodiment all schematically illustrate constituent members with partial highlights, enlargement, reduction or omission in order to deepen understanding, and do not accurately illustrate scales, shapes and the like of the constituent members in some cases.

Figure 1:
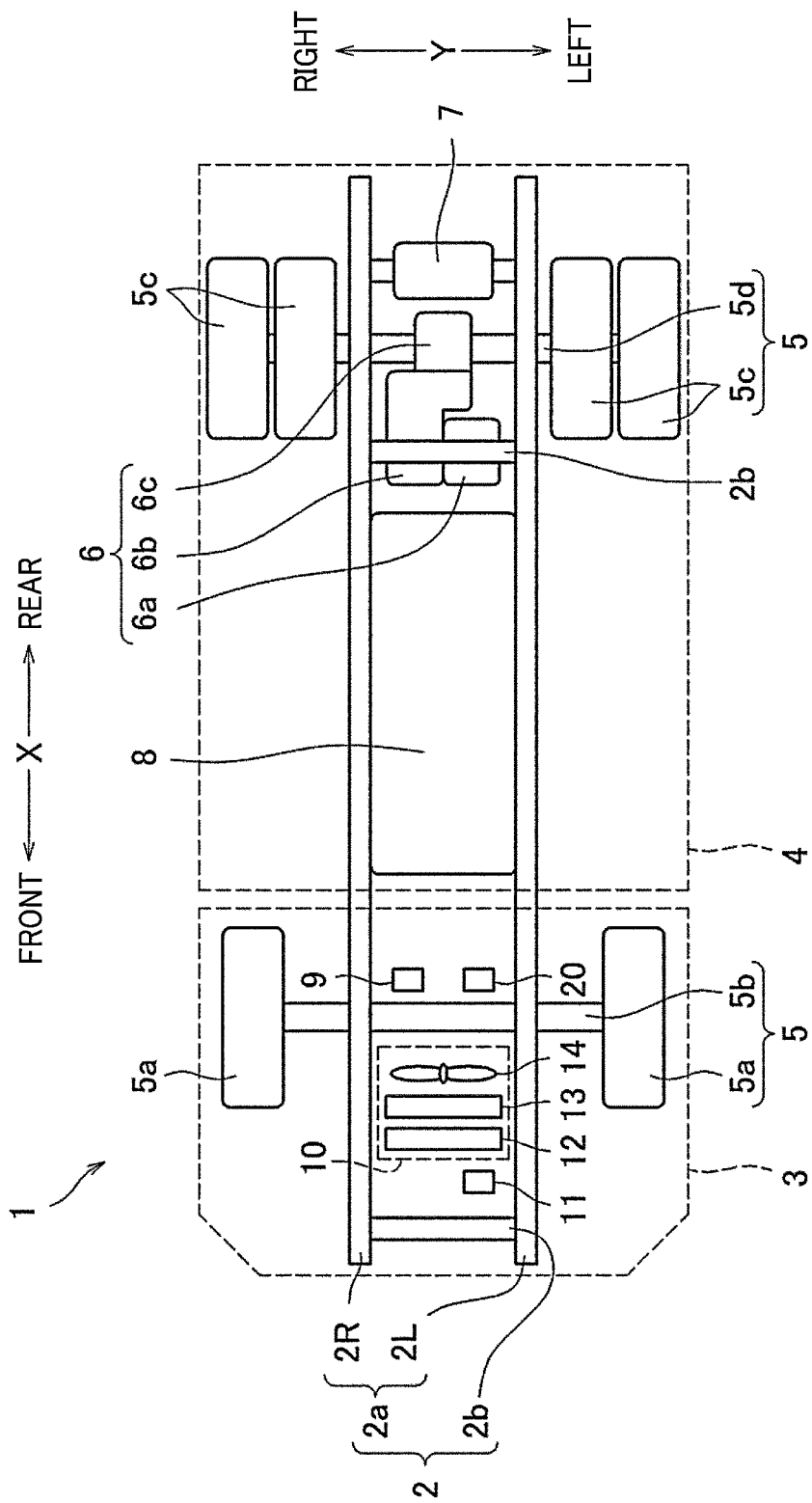
FIG. 1 is a top view schematically illustrating entire configuration of a vehicle according to the present invention.

FIG. 1 is a top view schematically illustrating entire configuration of a vehicle 1 according to the present invention. As illustrated in FIG. 1, the vehicle 1 according to this embodiment is an electric truck including a ladder frame 2, a cab 3, a packing box 4, a wheel mechanism 5, a drive unit 6, an inverter 7, a battery 8, a DC-DC converter 9, a radiator mechanism 10, a chiller 11, and a VCU 20 as a "control portion". FIG. 1 is illustrated as a top view when the cab 3 and the packing box 4 are transmissively seen through an upper surface of the vehicle 1. Moreover, the vehicle 1 includes a first refrigerant circulation circuit 30, a second refrigerant circulation circuit 40, and a chiller circuit 50, not shown in FIG. 1, other than the aforementioned configuration.

In this embodiment, the vehicle 1 is assumed to be an electric automobile including an electric motor (a motor 6a which will be described later) as a drive source for traveling but may be a hybrid automobile further including an engine. Moreover, the vehicle 1 is not limited to electric trucks but may be other commercial vehicles such as electric garbage trucks.

The ladder frame 2 has side rails 2a and a plurality of cross members 2b. Moreover, the side rails 2a extend along a vehicle longitudinal direction X of the vehicle 1 and are constituted by a left side rail 2L and a right side rail 2R disposed in parallel to each other in a vehicle width direction Y. The plurality of cross members 2b connect the left side rail 2L and the right side rail 2R. That is, the ladder frame 2 constitutes a so-called ladder-type frame. And the ladder frame 2 supports the cab 3, the packing box 4, the drive unit 6, the inverter 7, the battery 8, and other heavy articles mounted on the vehicle 1.

The cab 3 is a structural body including a driver's seat, not shown, and is provided on an upper front part of the ladder frame 2. On the other hand, the packing box 4 is a structural body on which packages and the like to be carried by the vehicle 1 are mounted and is provided on an upper rear part of the ladder frame 2.

The wheel mechanism 5 is constituted by left and right front wheels 5a located on the front of the vehicle, a front axle 5b as an axle of the two front wheels 5a, rear wheels 5c located on the rear of the vehicle and disposed two each on the left and right, and a rear axle 5d as an axle of the rear wheels 5c in this embodiment. And in the vehicle 1 according to this embodiment, a driving force is transmitted such that the rear wheels 5c function as drive wheels, and the vehicle 1 travels. It is to be noted that the wheel mechanism 5 is suspended by the ladder frame 2 through a suspension mechanism, not shown, and supports the weight of the vehicle 1.

The drive unit 6 has a motor 6a, a speed reduction mechanism 6b, and a differential mechanism 6c. The motor 6a generates a driving force required for traveling of the vehicle 1 by AC power supplied from the inverter 7 which will be described later. The speed reduction mechanism 6b includes a plurality of gears, not shown, reduces a rotary torque input from the motor 6a and outputs it to the differential mechanism 6c. The differential mechanism 6c distributes the power input from the speed reduction mechanism 6b to the left and right rear wheels 5c. That is, the drive unit 6 reduces a driving torque of the motor 6a to a rotational speed suitable for the traveling of the vehicle through the speed reduction mechanism 6b and the differential mechanism 6c and transmits the driving force to the rear axle 5d. As a result, the drive unit 6 can rotate the rear wheels 5c through the rear axle 5d and cause the vehicle 1 to travel.

Moreover, the motor 6a can perform regenerative braking as an auxiliary brake when the speed of the vehicle 1 is to be reduced.

The inverter 7 converts DC power supplied from the battery 8 to AC power and supplies it to the motor 6a and controls the rotational speed of the motor 6a in accordance with an accelerator operation to the vehicle 1.

The battery 8 is a secondary cell which supplies power to the motor 6a as an energy source for causing the vehicle 1 to travel. The battery 8 includes a plurality of battery modules (not shown) which are relatively large-sized and have a large capacity therein in order to store power required for the vehicle 1. Moreover, when a plurality of auxiliary machines and a power distribution unit which supplies power to them are mounted on the vehicle 1 (none of them shown), the battery 8 may be configured such that power can be supplied also to the power distribution unit. Furthermore, the battery 8 is charged with regenerative power generated by regenerative control by the motor 6a which performs the regenerative control at braking of the vehicle 1.

The DC-DC converter 9 is a power converting device for supplying power to low-voltage devices mounted on the vehicle 1 by lowering a voltage of the relatively high-voltage power output from the battery 8.

The radiator mechanism 10 is an air-cooling apparatus for cooling the refrigerants which circulate through the first refrigerant circulation circuit 30 and the second refrigerant circulation circuit 40 whose details will be described later, respectively, in this embodiment. The radiator mechanism 10 in this embodiment includes a first radiator 12, a fan 14 provided adjacent to the first radiator 12, and a second radiator 13 disposed between the first radiator 12 and the fan 14.

The chiller 11 is an evaporator driven by the power of the battery 8 and is a cooling apparatus for cooling the refrigerant which circulates in the chiller circuit 50 whose details will be described later.

The VCU 20 includes an input/output device, a storage device (ROM, RAM and the like) provided for storing a control program, a control map and the like, a central processing unit (CPU), a timer counter and the like (none of them is shown) and is a vehicle control unit for integrally controlling the entire vehicle 1 by executing state monitoring and controlling various components mounted on the vehicle 1.

Figure 2:
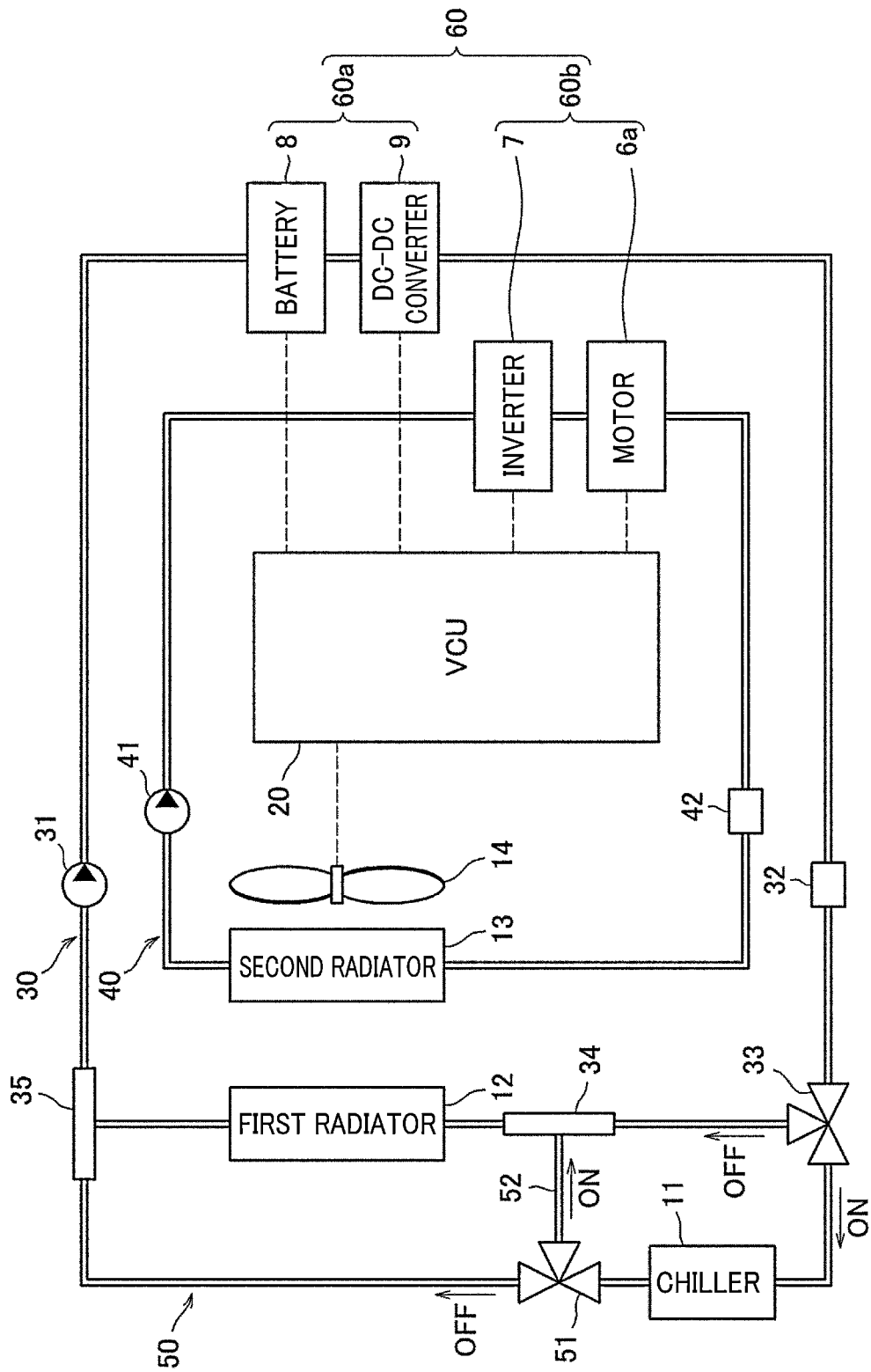
FIG. 2 is a configuration diagram illustrating a first refrigerant circulation circuit, a second refrigerant circulation circuit, and a chiller circuit.

FIG. 2 is a configuration diagram illustrating the first refrigerant circulation circuit 30, the second refrigerant circulation circuit 40, and the chiller circuit 50. The cooling mechanism constituted by the first refrigerant circulation circuit 30, the second refrigerant circulation circuit 40, and the chiller circuit 50 performs cooling by circulating the refrigerant in a high-voltage device group 60 mounted on the vehicle 1. It is to be noted that, in FIG. 2, delivery/reception of information between the VCU 20 and each of the constituent elements are illustrated by broken lines. In this embodiment, the "cooling apparatus for vehicle" is constituted by the radiator mechanism 10, the VCU 20, the first refrigerant circulation circuit 30, the second refrigerant circulation circuit 40, and the chiller circuit 50.

Here, the fan 14 of the radiator mechanism 10 air-cools the first radiator 12 and the second radiator 13 provided on the flow passage of outside air by taking in the outside air through rotation on the basis of a control signal from the VCU 20 and can air-cool the refrigerant going through each of them.

The first refrigerant circulation circuit 30 cools a first group device 60a by circulating the first refrigerant which radiates heat by the first radiator 12 for the battery 8 and the DC-DC converter 9 categorized as the first group devices 60a in the high-voltage device group 60 in this embodiment.

More specifically, the first refrigerant in the first refrigerant circulation circuit 30 is supplied by a first pump 31 to the battery 8 and the DC-DC converter 9 and cools the first group device 60a. At this time, a temperature of the first refrigerant rises by heat exchange with the first group device 60a. Then, regarding the first refrigerant, a flow passage is selected by a first valve 33 after the temperature is measured by a first water-temperature sensor 32.

The first valve 33 is an electromagnetic valve controlled by the VCU 20 and is a three-way valve which sorts the flowing-in first refrigerant to either one of the chiller 11 and a first T-joint 34. In more detail, regarding the first valve 33, a flow passage communicating with the chiller 11 is selected when an ON signal is received from the VCU 20, while a flow passage communicating with the first T-joint 34 is selected when an OFF signal is received from the VCU 20, for example. The VCU 20 executes control of turning OFF the first valve 33 when the first group device 60a can be sufficiently cooled by a cooling capacity of the first refrigerant circulation circuit 30.

The first refrigerant sent out from the first valve 33 in the OFF state is supplied to the first radiator 12 through the first T-joint 34 and radiates heat by the first radiator 12 and then, returns to the first pump 31 through a second T-joint 35. Here, the first T-joint 34 causes the first valve 33 and the first radiator 12 to communicate with each other and causes a communication circuit 52 which will be described later and the first radiator 12 to communicate with each other. Moreover, the second T-joint 35 causes the first radiator 12 and the first pump 31 to communicate with each other and causes the chiller circuit 50 whose details will be described later and the first pump 31 to communicate with each other.

As described above, the first refrigerant circulation circuit 30 performs heat exchange with the first group device 60a in the high-voltage device group 60 and cools the first group device 60a by means of the circulation of the first refrigerant which radiates heat by the first radiator 12. It is to be noted that an order in which the first refrigerant is circulated through each of the constituent elements in the first refrigerant circulation circuit 30 is not limited to this but can employ various modes.

The second refrigerant circulation circuit 40 cools a second group device 60b by circulating the second refrigerant which radiates heat by the second radiator 13 for the inverter 7 and the motor 6a categorized as the second group devices 60b in the high-voltage device group 60 in this embodiment.

More specifically, the second refrigerant in the second refrigerant circulation circuit 40 is supplied by a second pump 41 to the inverter 7 and motor 6a and cools the second group device 60b. At this time, a temperature of the second refrigerant rises by heat exchange with the second group device 60b. Then, after the temperature is measured by a second water-temperature sensor 42, the second refrigerant radiates heat by the second radiator 13 and returns to the second pump 41.

As described above, the second refrigerant circulation circuit 40 performs heat exchange with the second group device 60b in the high-voltage device group 60 and cools the second group device 60b by means of the circulation of the second refrigerant which radiates heat by the second radiator 13. It is to be noted that the order in which the second refrigerant is circulated through each of the constituent elements in the second refrigerant circulation circuit 40 is not limited to this but can employ various modes.

The chiller circuit 50 causes the first valve 33 and the second T-joint 35 to communicate with each other through the aforementioned chiller 11 and a second valve 51 as a "flow-passage switching valve" in this embodiment. Moreover, in the chiller circuit 50, the communication circuit 52 which causes a downstream side of the chiller 11 and the first T-joint 34 located on an upstream side of the first radiator 12 to communicate with each other through the second valve 51 is formed.

Here, the second valve 51 is an electromagnetic valve controlled by the VCU 20 and is a three-way valve which sorts the flowing-in refrigerant to either one of the second T-joint 35 and the first T-joint 34. In more detail, regarding the second valve 51, a flow passage communicating with the first T-joint 34 is selected when the ON signal is received from the VCU 20, while a flow passage communicating with the second T-joint 35 is selected when the OFF signal is received from the VCU 20, for example. The VCU 20 executes control of turning ON the first valve 33 and executes control of turning OFF the second valve 51 when the first group device 60a cannot be sufficiently cooled by the cooling capacity of the first refrigerant circulation circuit 30. As a result, the first refrigerant in the first refrigerant circulation circuit 30 can increase the cooling capacity for the first group device 60a by being cooled by the chiller 11 instead of heat radiation by the first radiator 12.

Moreover, the chiller circuit 50 is exemplified as an auxiliary cooling circuit for increasing the cooling capacity for the first refrigerant circulation circuit 30 in this embodiment but may be a cooling circuit independent of the first refrigerant circulation circuit 30. It is to be noted that the first refrigerant, the second refrigerant and the refrigerant circulated through the chiller circuit 50 may be water, for example, or a well-known antifreeze fluid.

In the aforementioned cooling mechanism, determination on necessity of cooling control for the high-voltage device group 60 and execution thereof are managed by the VCU 20. That is, the VCU 20 determines the necessity of the cooling control for the high-voltage device group 60 by obtaining temperature related information corresponding to the respective temperatures of the high-voltage device group 60 and comprehensively controls a rotation number of the fan 14, respective flowrates of a first fluid and a second fluid by the first pump 31 and the second pump 41, selected flow passages in the first valve 33 and the second valve 51 and the like so that the temperatures of the high-voltage device group 60 are within respective operating ranges.

Here, the temperature related information is temperature information of the first refrigerant obtained by the first water-temperature sensor 32 and temperature information of the second refrigerant obtained by the second water-temperature sensor 42 in this embodiment. However, when a temperature sensor is provided for each of the high-voltage device group 60, the temperature related information may be individual device temperature measured through the temperature sensors.

In the radiator mechanism 10 in which the first radiator 12, the second radiator 13, and the fan 14 are disposed by being aligned along the vehicle longitudinal direction X as in this embodiment, the second radiator 13 is located on the downstream side of the first radiator 12 in a flow passage of the outside air taken in by the fan 14. Thus, since the outside air after the temperature has risen by the heat exchange with the first radiator 12 is supplied to the second radiator 13, the cooling capacity is relatively lowered as compared with the first radiator 12.

Therefore, if the inverter 7 or the motor 6a in the second group device 60b needs a capacity larger than the cooling capacity in the ordinary system design due to some nonconformity, there is a concern that the aforementioned ordinary cooling operation cannot cope with that.

Thus, in the present invention, when the cooling capacity for the second group device 60b is insufficient as above, the cooling capacity of the second radiator 13 is increased by controlling the second valve 51 as an emergency measure so that the refrigerant cooled by the chiller 11 flows to the first radiator 12 through the communication circuit 52.

More specifically, the VCU 20 determines whether the cooling capacity of the second refrigerant circulation circuit 40 is sufficient or not by obtaining the temperature related information corresponding to the temperature of the second group device 60b, that is, the temperature information of the second refrigerant obtained by the second water-temperature sensor 42. Then, if the cooling capacity of the second refrigerant circulation circuit 40 is insufficient, the VCU 20 executes control of turning both the first valve 33 and the second valve 51 ON. As a result, the first refrigerant passing through the first valve 33 flows in a flow passage to the first radiator 12 through the chiller 11, the second valve 51, the communication circuit 52, and the first T-joint 34 in order.

In this case, the first refrigerant cooled by the chiller 11 flows through the first radiator 12 at a temperature lower than that in a state where heat is radiated only by the first radiator 12 and thus, the outside air taken in by the fan 14 and passing through the first radiator 12 can be cooled. Thus, the second radiator 13 provided on the downstream side of the first radiator 12 on the flow passage of the outside air can cause the second refrigerant to radiate heat by the heat exchange with the cooled outside air, and the cooling capacity for the second group device 60b can be increased.

As described above, the cooling apparatus for vehicle according to the present invention supplies the refrigerant cooled by the chiller 11 to the first radiator 12 through the communication circuit 52 when the second group device 60b cooled by the second radiator 13 through the second refrigerant needs the cooling capacity larger than the ordinary in the radiator mechanism 10 in which the first radiator 12, the second radiator 13, and the fan 14 are disposed in order. At this time, since the first radiator 12 can cool the outside air taken in by the fan 14 by the refrigerant cooled by the chiller 11, the cooled outside air can be supplied to the second radiator 13 disposed on the downstream side. As a result, the second radiator 13 cools the second refrigerant by the outside air and thus, it can increase the cooling capacity for the second group device 60b.

Moreover, at this time, the cooling efficiency of the second radiator 13 can be improved without employing means for providing the fan 14 for each radiator or means for increasing the size of the fan 14. Therefore, according to the cooling apparatus for vehicle according to the present invention, even if the high-voltage device needs the cooling capacity larger than the ordinary at emergency, the cooling capacity thereof can be increased easily without making the system redundant.

REFERENCE SIGNS LIST

1 Vehicle
11 Chiller
12 First radiator
13 Second radiator
14 Fan
30 First refrigerant circulation circuit
40 Second refrigerant circulation circuit
50 Chiller circuit
52 Communication circuit
60 High-voltage device group
60a First group device
60b Second group device

The invention claimed is:

1. A cooling apparatus for a vehicle for cooling a high-voltage device group mounted on the vehicle, comprising:
    a radiator mechanism including a first radiator, a fan disposed adjacent to the first radiator, and a second radiator disposed between the first radiator and the fan;
    a first refrigerant circulation circuit for performing heat exchange with a first group device in the high-voltage device group by circulation of a first refrigerant which radiates heat by the first radiator;
    a second refrigerant circulation circuit for performing heat exchange with a second group device in the high-voltage device group by circulation of a second refrigerant which radiates heat by the second radiator; and
    a chiller circuit including a chiller, wherein the chiller circuit includes a communication circuit, wherein the communication circuit is disposed between a flow-passage switching valve which is located on a downstream side of the chiller in the chiller circuit and a T-joint which is located on an upstream side of the first radiator, and wherein the first refrigerant cooled by the chiller is flowable from the chiller through the flow-passage switching valve, through the communication circuit, and through the T-joint and then from the T-joint into the first radiator such that a cooling capacity of the second radiator is increased.

2. The cooling apparatus according to claim 1, further comprising:
    a control portion for determining whether a cooling capacity of the second refrigerant circulation circuit is sufficient or not for performing the heat exchange with the second group device in the high-voltage device group by circulation of the second refrigerant which radiates heat by the second radiator based on temperature-related information corresponding to a temperature of the second group device, wherein when the cooling capacity is insufficient, the control portion controls the flow-passage switching valve so that the first refrigerant is cooled by the chiller and flows to the first radiator.

3. The cooling apparatus according to claim 1, wherein the second group device includes a motor or an inverter.

* * * * *